US012630475B2

(12) United States Patent
Weitkämper et al.

(10) Patent No.: US 12,630,475 B2
(45) Date of Patent: May 19, 2026

(54) METHOD OF PROVIDING A REACTIVE CEMENT CONSTITUENT OR CONCRETE ADDITIVE

(71) Applicant: Rheinisch-Westfälische Technische Hochschule (RWTH) Aachen, Aachen (DE)

(72) Inventors: Lars Weitkämper, Aachen (DE); Martin Rausch, Aachen (DE); Dirk Gossmann, Aachen (DE); Anya Vollpracht, Aachen (DE); Hermann Wotruba, Aachen (DE); Andreas Jungmann, Essen (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 598 days.

(21) Appl. No.: 17/923,013

(22) PCT Filed: Apr. 28, 2021

(86) PCT No.: PCT/EP2021/061193
§ 371 (c)(1),
(2) Date: Nov. 3, 2022

(87) PCT Pub. No.: WO2021/224094
PCT Pub. Date: Nov. 11, 2021

(65) Prior Publication Data
US 2023/0219843 A1 Jul. 13, 2023

(30) Foreign Application Priority Data
May 6, 2020 (DE) ...................... 10 2020 112 207.1

(51) Int. Cl.
*C04B 14/10* (2006.01)
*C04B 28/02* (2006.01)

(52) U.S. Cl.
CPC .............. *C04B 14/10* (2013.01); *C04B 28/02* (2013.01)

(58) Field of Classification Search
CPC ......... Y02W 30/91; Y02P 40/10; Y02P 40/18; F27B 1/005; F27B 1/02; F27B 1/21;
(Continued)

(56) References Cited

U.S. PATENT DOCUMENTS

| | | | |
|---|---|---|---|
| 7,481,878 B1 | 1/2009 | Perez-Cordova | |
| 7,681,736 B2 * | 3/2010 | Brandner | ................ B07C 5/344 |
| | | | 209/214 |
| 10,294,152 B2 * | 5/2019 | Rohloff | ..................... C04B 7/26 |

FOREIGN PATENT DOCUMENTS

| | | |
|---|---|---|
| CN | 105793209 A | 7/2016 |
| CN | 108349804 A | 7/2018 |

(Continued)

OTHER PUBLICATIONS

"Silica, Some Silicates, Coal Dust and para-Aramid Fibrils": "Coal Dust", 1997, IARC Monographs on the Evaluation of Carcinogenic Risks to Humans, No. 68., IARC Working Group on the Evaluation of Carcinogenic Risks to Humans. (Year: 1997).*
(Continued)

*Primary Examiner* — Amber R Orlando
*Assistant Examiner* — Ryan Patrick Loughran
(74) *Attorney, Agent, or Firm* — Brooks Kushman P.C.

(57) ABSTRACT

A method of providing a reactive cement constituent or concrete additive includes at least the following steps:
a) reworking a carbon-containing heap comprising at least coal and clay-bearing rock;
b) extracting at least calcined rock;
c) producing fine-grain calcined rock; and
d) providing fine-grain calcined rock for use as cement constituent or concrete additive.

10 Claims, 1 Drawing Sheet

(58) Field of Classification Search
CPC ......... F27B 1/22; F27B 1/24; F27M 2003/03; F27D 17/20; Y10S 106/01; Y10S 264/49
See application file for complete search history.

(56) References Cited

FOREIGN PATENT DOCUMENTS

| | | | |
|---|---|---|---|
| DE | 102013006236 | A1 | 10/2014 |
| DE | 102013113475 | A1 | 6/2015 |
| EP | 3248952 | A1 | 11/2017 |

OTHER PUBLICATIONS

"Experimental Research on Combustion, Pyrolysis Characteristics, and Kinetics of Three Different Coal Samples in China", ACS Omega, 2023, 8, 34388-34396 (Year: 2023).*
International Search Report and Written Opinion for PCT/EP2021/061193 mailed Aug. 2, 2021 (11 pages; with English translation).
China State Intellectual Property Office—Office Action mailed Jan. 17, 2024 for related application No. CN202180047953.1 (14 Pages; with English translation).

* cited by examiner

METHOD OF PROVIDING A REACTIVE CEMENT CONSTITUENT OR CONCRETE ADDITIVE

CROSS-REFERENCE TO RELATED APPLICATIONS

This application is a national stage of, and claims priority to, Patent Cooperation Treaty Application No. PCT/EP2021/061193, filed on Apr. 28, 2021, which application claims priority to German Application No. DE 10 2020 112 207.1, filed on May 6, 2020, which applications are hereby incorporated herein by reference in their entireties.

BACKGROUND

Global evolution with regard to population growth, increasing urbanization and economic progress is increasing the demand for new buildings and infrastructure, and hence concrete. Even nowadays, concrete, after water, based on mass, is the second most common substance employed by man. Even though concrete has low specific $CO_2$ emissions of less than 150 $kgCO_{2,eq}$/t of concrete, it is responsible for 5-8% of man-made $CO_2$ emissions on account of the volume used.

The majority of emissions from concrete comes from the production of the cement clinker, the main component of cement. For production of cement clinker, a mixture of lime-containing rock and of clay is ground and then calcined; during the process, the lime present in the raw meal gives off carbon dioxide ($CO_2$) and is converted to burnt lime (CaO). Later on in the combustion process, the raw meal that has been deacidified by the elimination of $CO_2$ is sintered to give various calcium silicate phases and calcium aluminate and calcium aluminate ferrite. A correspondingly complex and energy-intensive plant for production of cement clinker and a corresponding process are known, for example, from DE 10 2013 006 236.

In modern cement plants, cement is produced in a continuous process from predominantly natural raw materials in a dry process. The raw materials (limestone, clay, optionally sand and iron ore) are typically quarried, precomminuted in crushers and conveyed into the cement plants. In tubular mills and alternatively other fine mills, the raw materials are ground together and simultaneously dried, giving rise to what is called raw meal, which is then burnt in a rotary furnace at temperatures of about 1450° C. to give clinker, which is then cooled down in a cooler to a temperature of below 200° C. The resultant grey-brown granules are then ground in ball mills and alternatively other fine mills together with gypsum or anhydrite to give the finished product, the cement. By the addition of different additives such as slag sand, pozzolan, fly ash and limestone, it is possible to produce cements having different chemical and physical properties.

Cement is what is called a hydraulic binder. "Hydraulic" substances refer to those that harden and are stable both under air and under water. Cement reacts with water to form insoluble stable compounds. These compounds, the calcium silicate hydrates, form fine acicular crystals that interdigitate with one another and thus lead to high strength of a slab of cement. These properties mean that cement is a binder that meets the high demands in the construction sector.

The cement industry must thus sharply reduce its associated emissions and simultaneously cover rising cement demand from the global economy.

BRIEF DESCRIPTION OF THE DRAWINGS

The invention and the technical field are elucidated hereinafter by figures that disclose particular embodiments, but the invention is not limited to these. The figures show, in schematic form.

DETAILED DESCRIPTION

Figure 1:
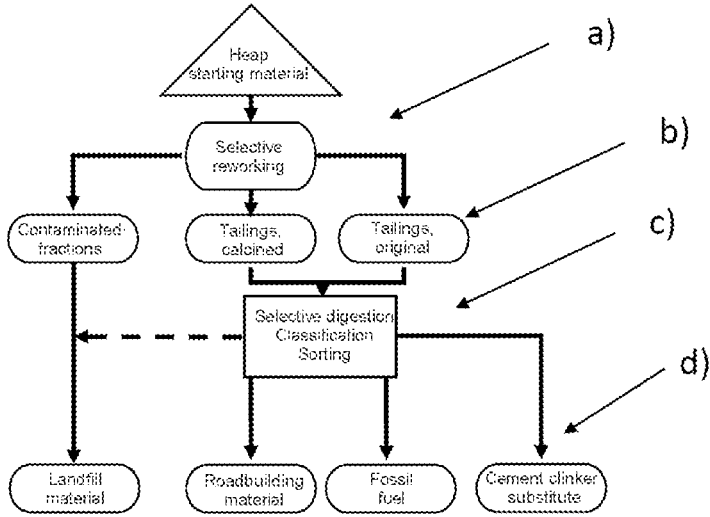
FIG. 1 is an overview of heap remediation with an integrated method of providing a reactive cement constituent or concrete additive.

It is therefore an object of the present disclosure to at least partly solve the problems mentioned with regard to producing cement. In particular, a method of more environmentally sound and/or resource-sparing obtaining of a further main constituent for cement is to be proposed. In addition, a material is to be proposed as concrete additive in concrete production, with which the cement content of the concrete can be reduced. In particular, a method of obtaining and providing binder-containing constituents for production of cement or concrete is to be specified.

These objects are achieved by a method and by a use described herein. It should be pointed out that the features mentioned herein are combinable with one another in any technologically viable manner. The description, especially in association with the figures, elucidates the method and use and gives further advantageous features of the disclosure.

A contribution to this is made by a method of providing a reactive cement constituent or concrete additive, comprising at least the following steps:

a) reworking a carbon-containing heap comprising at least coal and clay-bearing rock;
  b) extracting at least calcined rock;
  c) producing fine-grain calcined rock;
  d) providing fine-grain calcined rock for use as cement constituent or concrete additive.

The aforementioned steps may be conducted in the sequence specified, but this is not absolutely required. In particular, it is possible that the steps at least partly overlap one another in time, are executed at different locations with a time delay and/or are repeated with different frequency.

In step a), a carbon-containing heap is reworked. This heap comprises at least coal and clay-bearing rock. In particular, the coal is hard coal. Rock is understood here to mean a (solid) natural material consisting predominantly or even at least essentially of mineral components. The rock comprises clay in a significant proportion. Most preferably, the heap is an accumulation of extracted material from a hard coal mine. "Reworking" in this connection especially means the at least partial removal, resorting, relayering, movement and/or displacement of coal, rock and/or extraneous substances in the heap, especially after the heap has existed for a long period of time (without reworking). Coal and/or rock may be present in the heap with a grain size of up to 100 mm [millimetres].

The method is especially employed in heaps comprising hard coal, and calcined and uncalcined clay. The average proportion of hard coal may be up to 15%. The calcined clay is "autogenously" calcined clay that has formed through burnout of the coal. This usually or more particularly proceeds via self-ignition of the coal in the heap under appropriate environmental conditions. On account of the local self-ignition that may have occurred repeatedly over time, dryness and temperatures in the range of 350-800° C. may have become established over a long period of time in sections of the heap, which have resulted in calcination of rock, especially clay.

Because the grain size may be coarse to some degree, it is advisable to subject at least a portion of the constituents of the heap to preliminary crushing, for example to a grain size in the range from about 30 to 40 mm. Such a process may be executed before and/or during step b).

In step b), at least a portion of the calcined rock present in the heap is extracted. It is possible that, in fact, solely the calcined rocks are extracted selectively from the heap. However, it is usually customary to strip away a section with all its constituents of the heap and subsequently to identify and separate the calcined rocks therefrom. In particular, there is provision and use of measures and/or apparatuses that recognize and extract the calcined rocks (independently and/or automatically) from the constituents of the heap.

For the subsequent addition of the calcined rock to cement, in step c), the fineness of the calcined rock is adjusted. In particular (with or without preliminary grinding steps), the finely divided fractions of the calcined rock, especially clay, are produced and/or separated out. It is possible that this takes place directly in the conditioning or immediately after the extraction from the heap, but it may also be the case, alternatively or cumulatively, that the fractions of calcined rock extracted from the heap are first processed (e.g. dried and/or ground) before step c) is executed. What is meant more particularly by "fine-grain" in this connection is that a grain size of the calcined rock is less than 5 mm [millimetres], especially less than 2 mm or even less than 1 mm. It is possible that the calcined rock is provided with a grain size of less than 200 μm [micrometres] or even less than 125 μm as binder constituent in the cement.

As per step d), fine-grain calcined rock is provided for use as cement constituent or concrete additive. This may mean that this calcined rock is sent directly to a production process for cement. In many cases, however, cement production is conducted at another location, and so the calcined rock obtained is conveyed thereto and processed at a later juncture.

The calcined rock especially comprises calcined clay.

In the calcination of clay, it especially loses surface area water and structural water. A consequence of this loss of water may be the formation of x-ray-amorphous meta-clay minerals. On further heating (500-1250° C.), melting of the meta-clay minerals forms either aluminosilicate glasses or possibly also mullite or cristobalite, but high contents of mullite and cristobalite are undesirable in the present case. These properties may be considered in the (selective) extraction of calcined clay from the fuel heap.

Step b) may comprise at least one of the following processes:

gravimetric sorting sensory sorting

The aforementioned processes may especially be utilized for separation or selection of the constituents of the heap. It may be advisable for this purpose to provide constituents with a grain size suitable for the process, i.e. more particularly to crush them beforehand, such that the grain size is not more than 50 mm.

The gravimetric sorting or density sorting especially comprises the determining of the mass of constituents of the heap, for example by means of what is called a weigh-out quantity. In particular, this may comprise sensory determination of the specific weight of heavy and light material and separation of these constituents with the aid of the sensor signal.

Sensory sorting is preferably effected with use of an image- and/or film-generating sensor, especially a camera. It is possible that this is an optical sensor. It is also possible to use a sensor that works in the near infrared region.

Step b) and/or step c) may comprise at least one of the following processes:

electrostatic separation magnetic separation

The aforementioned processes may especially be utilized for removal or selection of the constituents of the heap or the calcined rock extracted. It may be advisable for this purpose to provide the constituents with a suitable grain size for the process, i.e. more particularly to crush and/or grind them beforehand such that the grain size is not more than 5 mm.

In electrostatic separation, a grain size of the constituents of not more than 2 mm is preferred. For this purpose, a separator may be used, having a high-voltage system, spray and precipitation electrodes, and a cleaning system. A particle-carrying air stream, or one comprising the constituents/extraneous materials, may be ionized therein by means of spray electrodes subject to a high negative voltage. The particles become negatively charged and accumulate at positively charged precipitation electrodes. The particles thus separated off may be removed from the separator with the cleaning system.

When a magnetic separation is used, the iron content of the rock to be separated out should be greater than 1.5% by weight and the grain size should be not more than 5 mm. In the simplest case, the material is run under a magnet on a conveyor belt. The magnetic rocks, especially the calcined clay with the specified iron content, are then attracted by the magnet and thus separated from non-magnetic materials.

After step b), at least a portion of the rock may be conditioned in that it is at least partly comminuted or dried.

What is meant more particularly by "conditioned" in this context is that the (calcined) rock is adjusted with regard to its properties in such a way that at least one of the subsequent processes or process steps can be executed with maximum efficiency. This may comprise the establishment of a defined grain size, for example by means of grinding, crushing, etc., and/or the establishment of a temperature and/or the establishment of a density or distribution in a volume or over an area and/or the establishment of a moisture content. For this purpose, a thermal treatment up to about 120° C. may be included.

The fine-grain or dusty fraction of the calcined rock may especially be mixed with further fractions of a cement composition. In the case of calcined clay, it is possible to at least partly replace especially the fraction of clinker and/or of fly ash of conventional cement composition. Alternatively, employment as concrete additive is possible. In particular, the properties of the calcined rock have been adjusted by the method proposed here for these substitution purposes.

It is assumed here that the use of calcined clay as reactive additive for cement and/or concrete production will gain increasing importance. The reason is that the calcination of the clay takes place at considerably lower temperatures than clinker formation from limestone. In this specific case, calcination has already taken place, and so the $CO_2$ balance is much more favourable than in the case of artificially calcined clays.

With progressive reworking and a continuing lack of new coal power plants and falling demand for pig iron, the availability of suitable fly ashes and blast furnace slags will fall.

Since coal is separated into a low-ash product (fuel) and an ash-rich product (tailings), and ash-rich fraction is obtained, which is generally backfilled into redundant mines or deposited in heaps. A multitude of tailings heaps, on account of the residual carbon contents within, have self-ignited and burnt or have burnt in an uncontrolled manner. The thermal process within the heap converts the incorporated mine waste fractions to clinker, or calcines them, such that considerable amounts of such a heap consist of burnt clays. These calcined clays are very similar in mineralogical and chemical terms to the additives to portland cement clinker. Furthermore, these calcined rocks are more $CO_2$-neutral compared to limestone and the portland cement clinker produced therefrom because the thermal treatment is virtually complete.

In the course of remediation measures, tailings heaps are increasingly being secured, relocated and renatured. The method described here can utilize a high proportion of the material [>50%] in an environmentally benign, sustainable and economically viable manner. A marketable raw material is formed from material to be landfilled. This reduces the proportion to be newly landfilled, and reduces demand for space and transport costs, and also the $CO_2$ emissions that arise in transportation.

Furthermore, it is also possible by the method described also to separate out unburnt residual coal as well as the calcined rocks, and to use it as fossil fuel.

The further uncalcined constituents or rocks, by the method described, may likewise be separated out by sorting and sent to further processing. For example, it is possible to use these rocks as roadbuilding material or recycled building material.

The burnt clays from hard coal deposits or from tailings heaps that are obtained by the method proposed can thus make a considerable contribution to the obtaining of SCMs (supplementary cementitious materials), since these clays have already been converted to clinker and there is no need for any thermal treatment at all.

It has been shown that "autogenously" calcined tailings processed selectively by the method, after fine comminution to cement fineness (>5000 Blaine), correspond to or even surpass the quality of industrially calcined clays or else the hard coal fly ashes that are in current use. The composite cement thus obtained has excellent potential for use across the board in the binder industry.

The solution proposed here considerably reduces $CO_2$ emission in cement production and lowers the necessary energy input. In addition, many developing countries with elevated cement demand lack high-quality raw materials for the production of cement binders. The cement substitute obtained by this method can make a valuable contribution here to raw material supply. It is known from China and India that a multitude of tailings heaps catch fire there, and even hard coal deposits have self-ignited. There is great potential here for use of the method.

In a further aspect, use of calcined clay obtained from a carbon-containing heap has been proposed for establishment of a hydraulic property of a cement composition or concrete composition.

The calcined clay may be used as substitute for cement clinker and/or fly ash and/or other artificial pozzolans or natural pozzolanic additives.

Also proposed, in addition, is use of calcined clay obtained from a carbon-containing heap for production, with reduced emissions or reduced energy, of a cement composition or concrete composition.

It is possible to use the calcined clay with a fraction of up to 25% or even at 40% of the cement composition without having to accept significant disadvantages with regard to the strength of the concrete—compared to a cement composition made from pure clinker.

Therefore, it is possible to replace high-energy "autogenously" calcined clay comprising costly and energy-intensively produced clinker of conventional cement compositions.

FIG. 1 firstly shows, at the top, a heap, which is the starting point for the method. Below that is shown a possible progression of the method. Proceeding from the heap, containing coal, rock and possibly extraneous materials, the first step is reworking as per step a). As a result, three fractions may be defined: contaminated fractions that should be sent to a landfill, and (calcined and uncalcined) tailings that can be subjected to the remainder of the method; in particular, the calcined constituents or rocks are extracted (step b)). These tailings are then classified as per step c), sorted and extracted or further diversified. As a result of this, a portion of the calcined rock is discharged as binder component (step d)). Moreover, constituents that are not suitable for use in cement/concrete can be used as roadbuilding material, and selected coal can be used as fossil fuel.

Figure 2:
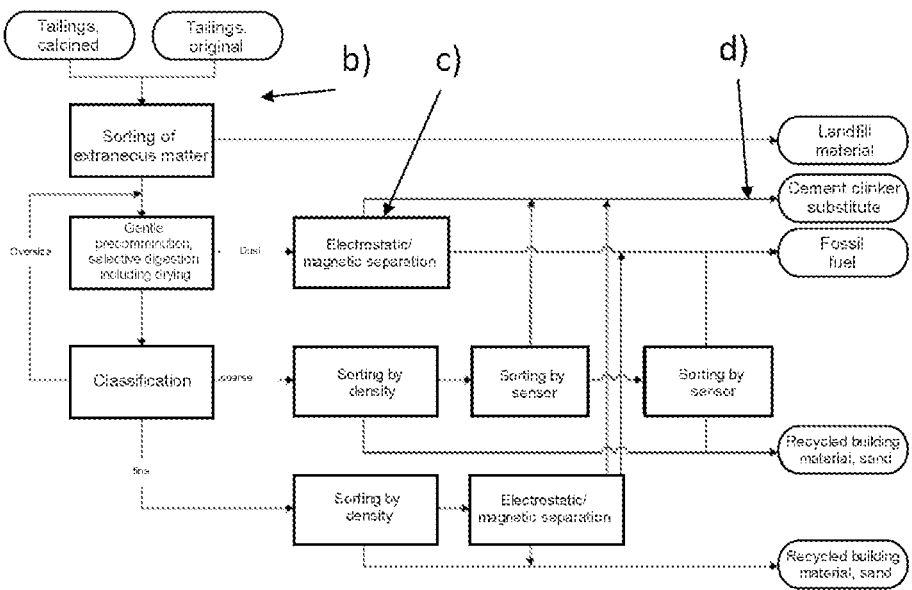
FIG. 2 is an overview of a treatment of heap components for provision of a reactive cement constituent or concrete additive.

FIG. 2 can illustrate a differentiated course of action in steps b) and c) from FIG. 1. According to this, with regard to the tailings, a (repeated) sorting of extraneous material can be effected, with discharge of landfill material. The remaining proportion can then (optionally repeatedly) be gently comminuted, subjected to thermal treatment and/or dried and optionally thereafter classified (repeatedly) in order to recognize/approve suitability of the current properties of the constituents or rocks for downstream processes, and to adjust them further if appropriate. Fine-grain or dusty components may, for example, be recognized by means of electrostatic and/or magnetic separation, sorted and assigned to the intended end use. Further fine fractions may, for example, (additionally) be recognized by means of density sorting, sorted and assigned to the intended end use. Coarse-grain fractions may likewise be assessed by density sorting, optionally with use of sensory sorting, before these too are recognized, sorted and assigned to the intended end use.

The invention claimed is:

1. A method of providing a reactive cement constituent or concrete additive, comprising:
   a) identifying a heap starting material from a heap being an accumulation of tailings of extracted material from a coal mine comprising at least coal and clay-bearing rock, wherein the heap starting material comprises at least calcined rock including autogenously calcined clay formed through burnout of the coal;
   b) selectively reworking the heap starting material and extracting the at least calcined rock from the heap starting material;
   c) producing fine-grain calcined rock from the at least calcined rock; and
   d) providing the fine-grain calcined rock, the fine-grained calcined rock being suitable for use as cement constituent or concrete additive.

2. The method of claim 1, wherein the calcined rock comprises clay.

3. The method of claim 1, wherein step b) comprises at least one of gravimetric sorting or sensory sorting.

4. The method of claim 1, wherein at least step b) or step c) comprises at least one of electrostatic separation or magnetic separation.

5. The method of claim 1, further comprising, after step b), conditioning at least a portion of the at least calcined rock by at least partly comminuting or drying the at least calcined rock.

6. The method of claim 1, wherein a separated fraction of the fine-grain calcined rock is mixed in step d) with further fractions of a cement composition.

7. The method of claim 1, further comprising establishing a hydraulic property of a cement composition or concrete composition by using calcined clay or rock from the fine-grain calcined rock.

8. The method of claim 7, further comprising using the calcined clay or rock as a substitute for cement clinker, fly ash or other synthetic pozzolans or natural pozzolanic additives.

9. The method of claim 1, further comprising producing a cement composition or concrete composition using calcined clay or rock from the fine-grain calcined rock.

10. The method of claim 1, wherein the heap starting material has an average portion of the coal of at most 15%.

* * * * *